G. H. PHILLIPS.

Cooking Stove.

No. 4,063.

Reissued July 5, 1870.

Witnesses:

Geo. W. Downs.

Ad. Brewer

Inventor:

Geo. H. Phillips.

By Marcus P. Norton his Attorney.

H. PETERS, Photo-Lithographer, Washington, D. C.

United States Patent Office.

GEORGE H. PHILLIPS, OF TROY, NEW YORK.

*Letters Patent No.* 83,790, *dated November* 3, 1868; *reissue No.* 4,063, *dated July* 5, 1870.

COOKING-STOVE.

The Schedule referred to in these Letters Patent and making part of the same.

*To all whom it may concern:*

Be it known that I, GEORGE H. PHILLIPS, of the city of Troy, county of Rensselaer and State of New York, have heretofore invented and made certain Improvements in "Cooking-Stoves," and in the attachment and combination of "Water-Reservoirs" thereto, for and upon the which Letters Patent of the United States of America were duly granted and issued to me on, and bearing the date of, the 3d day of November, 1868. Now, therefore, I, the said GEORGE H. PHILLIPS, do hereby declare that the following is a full, clear, and exact description of the nature, construction, and operation of my said invention and improvements, reference being hereby had to the accompanying drawings and to the letters of reference marked thereon, and which drawings, so marked and lettered, make a part of these my new specifications and claims, herein and hereby corrected, reformed, and amended, upon my surrender of the said original Letters Patent, in conformity to the law, for the purpose and in order that the said invention and improvements named as aforesaid may herein and hereby be more fully and more correctly specified, described, set forth, and claimed, and, by such new, corrected, reformed, and amended specifications, claims, and drawings, my rights therein and thereto shall, by reason and by means of a new or reissued Letters Patent, be more fully, more perfectly, and more permanently protected and defended thereby, as by the law contemplated and provided.

Like letters marked upon the accompanying drawings represent and refer to like or corresponding parts of my said invention and improvements, represented upon and illustrated thereupon and thereby.

Figure 1:
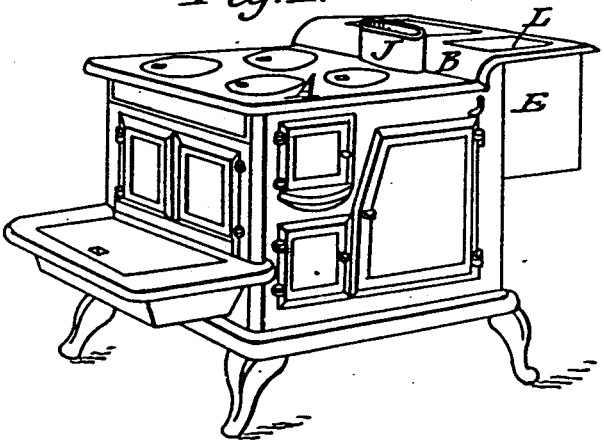

Figure 1 represents a perspective view of a cooking-stove containing my invention and improvements, and having a water-reservoir attached to and in combination with the same, in the manner and by the means substantially as shown, and as herein described and set forth, as well as claimed.

Figure 2:
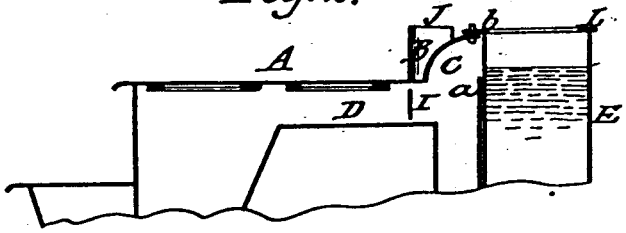

Figure 2 is a vertical section, lengthwise, of said cooking-stove, shown at said fig. 1 of the accompanying drawings, and on a line next or near to one side of the exit-flue or pipe-collar leading to the chimney, and showing one of the main and substantial modes of attaching, securing, and combining the water-reservoir to the upward curved top-plate of such cooking-stove, having immediately underneath such curve of said top plate a hot-air chamber or chambers, and one of the sides thereof in immediate contact with and directly exposed to and open against a corresponding part or portion of the said water-reservoir, in the manner substantially as herein described and set forth, and as shown in and by the accompanying drawings.

Figure 3:
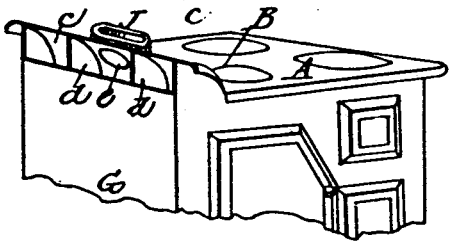

Figure 3 is a perspective view of a cooking-stove, showing the rear vertical end of same with the water-reservoir omitted or off therefrom, for the purpose of exposing to view, in a more positive and thorough manner, the hot-air chamber, and chambers just underneath the upward curve, of all that part or portion of the top plate of the said stove which is above and over the diving or descending and ascending-flues in the rear end of such stove, and coming near to or in contact with the water-reservoir thereof, and each and every of which is more at large or more fully described hereinafter.

Having thus explained and described the said several figures of said accompanying drawings—

The nature of my said invention and improvements consists in curving upward, or elevating upward, all of that part or portion of the rear end of the top plate of said stove which is above, and which extends over the diving or descending and ascending-flue or flues in the rear end of such stove, so as to form, in part, a hot-air chamber or chambers immediately thereunder, with the base or lower part of the same upon a line or horizontal plane with the immediate upper surface of the top plate of said cooking-stove, while the front and upper parts of such chamber or chambers are formed by means of the upward curve of the said top plate, and the rear and opposite side formed and completed by means of a corresponding part or portion of said reservoir, and thus and thereby creating and perfecting such hot-air chamber or chambers above the top surface of the top plate of the cooking-stove, and above and over the diving-flues or descending and ascending-flues in the rear end of such stove, in the manner and for the uses and purposes substantially as shown in the said accompanying drawings, and herein described, set forth, and claimed.

It also consists in extending upward above the horizontal plane of the top plate of said stove the rear end vertical flues and the vertical wall strips or partition, or flue-division pieces, in such manner as to form, by means thereof, hot-air or heating-chambers thereat, which are used in combination with a water-reservoir or tank arranged thereat and connected therewith for warming and heating water therein, in the manner substantially as hereinafter described and set forth, and as shown at fig. 3 of the accompanying drawings.

It also consists in the supporting by and securing or fastening to the upward projecting curve of the top plate of a cooking-stove, a water-reservoir, wherein and whereby to warm or heat water, while a part of said reservoir shall, thus fastened and suspended, rest against and come in contact with the rear end vertical plate of said stove, from the bottom part of said reservoir to the immediate top edge of such rear end vertical plate, which edge will in all cases be and remain upon a line with the horizontal plane of the top plate of the stove, while all that part or portion of said reservoir not in contact with said rear end plate shall be exposed to the direct and positive action of the heated air or escaping heated gases or products of combustion after the same shall have passed the entire oven-plate exposed to said vertical end flues, and also passed the entire flue-space over and immediately above the top oven-plate, substantially as shown at figs. 2, 3, and 4 of the accompanying drawings, and as herein described and set forth.

Having thus described the said several figures of the accompanying drawings, as well as set forth the nature of my said invention and improvements, and in order to enable those skilled in the art to which my said invention in anywise relates to make, construct, and use the same, I will here proceed to describe the construction, arrangement, combinations, and operation of the same, which is substantially as follows, that is to say:

The rear end plate G of the stove, against which the lower part of the front side of the reservoir E rests, is made in any suitable form or shape to permit said part of said reservoir to come into proximity thereto, substantially as shown at figs. 2 and 3.

The said rear end vertical plate G, figs. 2, 3, and 4, may be made of any suitable thickness, having its upper edge terminate at *a*, substantially as shown at said figs. 2 and 4, which upper edge *a* will always be in and upon the line or horizontal plane of the upper surface of the top plate A of the said cooking-stove.

The top plate A of said stove, at its rear part, is curved or raised upward above its boiler-hole or horizontal plane, and over and above the vertical descending and ascending-flues at the rear end of said stove, and above the top edge *a* of said rear end plate G, which top edge *a* is constructed and arranged upon a horizontal line with the boiler-hole plane of said top plate A.

The said curved or raised-up portion of said top plate A may be seen at B, figs. 1, 2, and 4, and it may be of any form, shape, size, or capacity that may be required for convenient and successful use and operation of the stove, with reservoir combined therewith, in the manner shown.

The more or the greater the elevation of said curved or bent portion or part A of said plate A, the more space or room will be afforded for the use and arrangement of a warming-closet underneath the bottom H of said reservoir E, and the same will also permit of an enlarged or greater capacity of such warming-closet when desired to use such a closet, which closet, of itself, is an old and well-known device, and is no part of my invention herein.

By thus elevating or curving upward the said top plate of said stove, substantially as shown at B, I am enabled to construct and arrange a hot-air chamber or chambers, C, which is arranged along and in close proximity to and with the said reservoir E, and above the upper edge *a* of said end plate G, and over and above the diving or descending and ascending-flues in the rear of the oven K, and in the rear end of said stove.

Should there be but two flues in the rear end of the stove, then there will be but two of said hot-air chambers C. But, when two division or partition flue-strips or plates *d* are used, as shown at fig. 3 of the accompanying drawings, then there will be three of said hot-air chambers C, as shown at same figure.

It is regarded as necessary in this stove to continue said partition flue-plates upward and above the said upper edge *a* of said plate G until the same shall remain a closely fit upon the under side of said curved plate or part B, substantially as shown at fig. 3, in order to a successful management and controlling of the draught of such stove by means of the ordinary and usual damper I, figs. 2 and 4.

The said hot-air chamber or chambers C open directly against all that part or portion of the reservoir E arranged and remaining just above the said upper edge *a* of said rear end plate G, substantially as shown at figs. 2 and 4.

Upon that side of said reservoir E, I construct a suitable flange for the purpose of resting, supporting, and fastening said reservoir to the immediate outer edge of the upward-curved portion B of said top plate A, by means of small screw-pins or bolts *b*, substantially as shown at fig. 2.

There may be as many such screw-pins or bolts as may be necessary to firmly hold and secure to said curved part B the said reservoir E, in the manner substantially as shown at said fig. 2.

Suitable holes will be drilled or cast in both the said upward curved plate B and the flange to rest upon or underneath said curved plate, so as to hold or support in its proper place and position the said reservoir E.

It may be more convenient to cast said curved part B with and as a part of that portion forming the reservoir covering-plate L, fig. 4, which is located and arranged over and upon the top of said reservoir E, and, when so cast, it will curve outward and downward until the same shall cover the said chamber C, and come into conjunction with the said top plate A, and be fastened thereto by the means of the screw-pins or bolts *c*, fig. 4, the whole appearing, in form and construction, substantially as shown at said fig. 4 of the accompanying drawings; and when said curved part or portion B is made upon and cast with the said top plate A, as a part or portion thereof, the whole will appear in form and shape substantially as shown at the said fig. 2 of the accompanying drawings, while, in either case or form, the invention and improvement is substantially and materially the same.

It will be observed that a considerable portion of said reservoir, when used and arranged in connection with said upward curved part or portion B of the said top plate A, is elevated or raised in same proportion above the line or horizontal plane of boiler-hole part of said top plate, substantially as shown at fig. 1 of the accompanying drawings.

The said curved portion B, when cast with all that part forming the covering over and upon the immediate top of said reservoir, will appear, as shown at figs. 1 and 4, as holding and supporting said reservoir in its proper place and position or condition against the vertical surface of the rear end vertical plate G.

When it is deemed best not to use or construct or require the hot-air chamber or chambers C in the manner and for the purposes as described, then there may be a plate covering the said end vertical flues, extending from the top edge *a* to the top plate A, directly opposite, and, in that case, there would be no direct action of the heat or hot gases against any part of the said reservoir, as hereinbefore described, but the heat for heating the water in said reservoir would be transmitted thereto through the said rear vertical plate, against which said reservoir is located and arranged, substantially as shown at fig. 1.

While that part of my said invention relating to the said upward curved part or portion B, connected and combined with the said reservoir, for the purposes substantially as aforesaid, and as a part of said top plate A, fig. 2, or as a part of the said reservoir covering-plate L, fig. 4, of said drawings, would be substantially and materially the same under any and all circumstances, I prefer, however, to construct and arrange a hot-air chamber or chambers of the kind, name, and purposes hereinbefore described and set forth.

When all parts of my said invention are constructed, arranged, and combined substantially as shown at said figs. 2 and 4, then the action of the heat or heated gases will be on the water in said reservoir, through said rear end vertical plate G, and thence through the said reservoir-plate, or side next adjoining, and in contact or close proximity with the said vertical end plate, until the same shall pass upward and above the top edge *a*, and come into direct and positive contact with all that part or portion above the line or horizontal plane of the upper surface of the boiler-hole portion of said top plate A, and nakedly exposed to the same, or directly open into or against said chamber or chambers C, whereby the water within said reservoir E is warmed or heated to any required or desired degree, in the manner and by the means substantially as shown at said figs. 2 and 4 of said drawings.

The said end vertical plate G is entire and complete, substantially as shown at fig. 3 of said drawings, and it will be seen that there is no removal or cutting away of any part or portion thereof for any purpose or use connected with said reservoir, or for any other purpose whatever, but the same is full and complete, as is the general and usual way of constructing the rear end vertical plate of cooking-stoves, the width of which being the same as that of the side or jamb-plates, to which the oven-doors are usually attached, and, in my said invention, there is no part or portion of said reservoir exposed to the direct and positive action of heat or hot gases passing down or up or through said diving or descending and ascending flues F of the stove, until the same shall have passed the upper edge *a* of said plate G, as well as above the horizontal line or plane of the top of said plate A.

J is the stove-pipe collar or exit-flue leading to the chimney, and it may be suitably located or arranged within or near the center vertical end plate, or with reference to the said curved reservoir-plate B, as the case may require.

The said upward curved plate B, for uses and purposes connected with said reservoir, it will be seen, may be thus used independent of the said hot-air chamber or chambers C, so long as it is so curved upward from the said top plate A, so as to reach the said reservoir E, for purposes connected with said reservoir.

The said curved plate B is not only useful, but the same is ornamental to the cooking-stove, as will be observed by reference to fig. 1 of the said drawings, and it may be cast of any thickness, of any form or shape, and in any way or manner deemed best in the construction of said cooking-stove, so long as the same shall appear substantially the same as shown in said drawings.

Having thus described the nature, construction, ann operation of my said original invention and improvements in cooking-stoves,

What I claim herein, and desire to secure by Letters Patent of the United States of America, is—

1. The curving or raising upward, outward, and over the rear end vertical flue or flues, of the rear end part of the top plate A, so as to form, at or above the upper end of such flues, a hot-air chamber or chambers, C, open at the rear side of the same, for the purpose of admitting the heat to and against a corresponding part or surface of the reservoir E exposed thereto, in the manner and by the means and for the purposes substantially as shown in the said drawings and as herein described and set forth.

2. The upward extension of the descending and ascending vertical flues or flue F within the rear end of said cooking-stove, so that the same shall be above the horizontal line or plane of the top plate A, and also above the said upper edge *a* of the rear end vertical plate G, and covered over at the immediate upper ends by means of the curved and upward extending plate B, or any equivalent of the same, in the manner and for the purposes substantially as herein described and set forth.

3. The employment, arrangement, and combination of the said curved and upward projecting plate B with the reservoir E, in the manner and by the means and for the purposes substantially as herein described and set forth, and substantially as shown and represented in and by the accompanying drawings.

4. The mode and manner, substantially as shown, and as herein described and set forth, for the receiving, and for the securing or fastening the said reservoir E to the top or covering-plate A of a cooking-stove, by means of the curved and upward projecting plate B, extending over the immediate rear diving or descending and ascending flue or flues within the rear of the oven, and next adjoining the rear end vertical plate G of the said cooking-stove, substantially as herein specified and set forth.

5. The arrangement and combination of the water-reservoir with the rear end of a cooking-stove, in such manner that all that part below the upper edge *a* of the rear end vertical plate G shall be brought against and in contact with such plate, while, at the same time, all that part of said reservoir which is above the horizontal line or plane of the top plate A shall be exposed to the direct action of the heat or escaping heated gases, after the same shall have passed the oven of such stove, so as thereby not to injure or retard the process of baking in said oven, by means of the cold or unheated water in said reservoir, as would be the case and result were there no intervening plate between the bottom H and the top plate A of said stove, in the manner and by the means substantially as herein described and set forth.

6. Connecting and combining the top or reservoir covering-plate L with the top and boiler-hole plate A, by means of the curved plate B, whereby and by the means of which the upper part or portion of such water-reservoir is raised or elevated upward and above an air line or horizontal plane of the upper surface of the said top plate A, substantially in the manner and for the purposes as herein described and set forth.

7. A boiler-hole or top plate, A, for a cooking-stove, having an upward curved and extending plate, B, arranged and combined therewith, so as to receive and support, in any good, convenient, and substantial manner, the hot-water reservoir E, in combination with the descending and ascending flues in the rear vertical end of the cooking-stove, in the manner substantially as herein described and set forth.

In testimony whereof, I have, on this 31st day of March, 1870, hereto set my hand.

GEO. H. PHILLIPS.

Witnesses:

MARCUS P. NORTON,
J. M. HOWK.